(12) United States Patent
Tamaru et al.

(10) Patent No.: US 12,206,122 B2
(45) Date of Patent: Jan. 21, 2025

(54) POWER STORAGE MODULE

(71) Applicant: KABUSHIKI KAISHA TOYOTA JIDOSHOKKI, Kariya (JP)

(72) Inventors: Kojiro Tamaru, Kariya (JP); Takashi Sakai, Kariya (JP); Masahiro Yamada, Kariya (JP); Sho Kishine, Kariya (JP); Hiroki Maeda, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 678 days.

(21) Appl. No.: 17/421,515

(22) PCT Filed: Mar. 10, 2020

(86) PCT No.: PCT/JP2020/010389
§ 371 (c)(1),
(2) Date: Jul. 8, 2021

(87) PCT Pub. No.: WO2020/203101
PCT Pub. Date: Oct. 8, 2020

(65) Prior Publication Data
US 2022/0094000 A1 Mar. 24, 2022

(30) Foreign Application Priority Data

Mar. 29, 2019 (JP) ................................. 2019-066424

(51) Int. Cl.
*H01M 50/186* (2021.01)
*H01G 11/28* (2013.01)
(Continued)

(52) U.S. Cl.
CPC .......... *H01M 50/186* (2021.01); *H01G 11/28* (2013.01); *H01G 11/52* (2013.01);
(Continued)

(58) Field of Classification Search
CPC .......... H01M 50/186; H01M 10/0585; H01M 50/176; H01M 2004/029; H01M 10/282;
(Continued)

(56) References Cited

U.S. PATENT DOCUMENTS

2016/0329535 A1* 11/2016 Moomaw ................ B29C 65/18
2017/0263909 A1 9/2017 Shimizu et al.
(Continued)

FOREIGN PATENT DOCUMENTS

CN 107112458 A 8/2017
JP 2010-277907 A 12/2010
(Continued)

OTHER PUBLICATIONS

International Preliminary Report on Patentability (with translation of Written Opinion) dated Sep. 28, 2021, issued by the International Bureau in application No. PCT/JP2020/010389.

*Primary Examiner* — Michael L Dignan
(74) *Attorney, Agent, or Firm* — Sughrue Mion, PLLC

(57) ABSTRACT

In a power storage module, a side surface of an electrode laminate body has a welded layer where first sealing portions adjacent in a lamination direction are welded. A sealing body has: a side surface (opening wall) provided with a through hole communicating with an internal space; and side surfaces (non-opening walls) lacking the through hole. When viewed from the lamination direction, a width of the welded layer at the opening wall is smaller than a width of the welded layer at the non-opening wall.

3 Claims, 12 Drawing Sheets

(51) Int. Cl.
*H01G 11/52* (2013.01)
*H01G 11/80* (2013.01)
*H01M 10/0585* (2010.01)
*H01M 4/02* (2006.01)
*H01M 50/176* (2021.01)

(52) U.S. Cl.
CPC ........ *H01G 11/80* (2013.01); *H01M 10/0585* (2013.01); *H01M 2004/029* (2013.01); *H01M 50/176* (2021.01)

(58) Field of Classification Search
CPC ........... H01M 10/0463; H01M 50/103; H01M 10/613; H01M 10/625; H01M 10/6555; H01M 10/6557; H01M 50/184; H01M 50/209; H01M 50/249; H01G 11/28; H01G 11/52; H01G 11/80; H01G 2/106; H01G 2/103; H01G 11/78; H01G 11/12; Y02E 60/10; Y02T 10/70

See application file for complete search history.

(56) References Cited

U.S. PATENT DOCUMENTS

2018/0233782 A1\* 8/2018 Herrmann ........... H01M 50/342
2019/0334195 A1 10/2019 Minagata et al.

FOREIGN PATENT DOCUMENTS

| | | |
|---|---|---|
| JP | 2011-204386 A | 10/2011 |
| JP | 2011-204836 A | 10/2011 |
| JP | 2012-234823 A | 11/2012 |
| JP | 2018-101599 A | 6/2018 |

\* cited by examiner

POWER STORAGE MODULE

CROSS REFERENCE TO RELATED APPLICATIONS

This application is a National Stage of International Application No. PCT/JP2020/010389 filed Mar. 10, 2020, claiming priority based on Japanese Patent Application No. 2019-066424 filed Mar. 29, 2019.

TECHNICAL FIELD

The present disclosure relates to a power storage module.

BACKGROUND ART

A bipolar battery including a bipolar electrode in which a positive electrode is formed on one surface of an electrode plate and a negative electrode is formed on the other surface is known in the related art as a power storage module (see Patent Literature 1). The bipolar battery includes a laminate body formed by a plurality of the bipolar electrodes being laminated via a separator. The side surface of the laminate body is provided with a sealing body providing sealing between the bipolar electrodes adjacent to each other in the lamination direction. An electrolytic solution is arranged in the internal space that is formed between the bipolar electrodes.

CITATION LIST

Patent Literature

Patent Literature 1: Japanese Unexamined Patent Publication No. 20111-204386

SUMMARY OF INVENTION

Technical Problem

In order to contain an electrolytic solution in a bipolar battery as in Patent Literature 1, it is necessary to form a liquid injection port for electrolytic solution injection into the battery in a sealing body. However, an increase in complexity in terms of manufacturing process may arise in a case where the liquid injection port is formed in the sealing body after the sealing body is formed so as to provide sealing between adjacent bipolar electrodes. In addition, a decline in the sealing performance of the sealing body may arise if the formation position of the liquid injection port deviates from the design.

The present disclosure has been made to solve the above problems, and an object of the present disclosure is to provide a power storage module capable of sufficiently ensuring the sealing performance of a sealing body without an increase in complexity in terms of manufacturing process.

Solution to Problem

A power storage module according to one aspect of the present disclosure includes: an electrode laminate body having a plurality of electrodes laminated in a first direction; a separator containing an electrolyte and arranged in an internal space formed between the electrodes adjacent to each other in the electrode laminate body; and a sealing body provided on an outer peripheral portion of the electrode laminate body and sealing the internal space, in which the plurality of electrodes include a bipolar electrode having a positive electrode active material layer on one surface of a current collector and having a negative electrode active material layer on the other surface of the current collector, the sealing body includes first sealing portions and a second sealing portion, the first sealing portion is joined to an edge portion of a current collector of each of the plurality of electrodes and has a protruding part protruding outward beyond the edge portion of the current collector, the second sealing portion is provided so as to cover an outer periphery of the first sealing portion on a side surface of the electrode laminate body extending in the first direction, the sealing body has a welded layer where the protruding parts of the first sealing portions adjacent to each other in the first direction are welded to each other and has an opening wall provided with a communication hole allowing the internal space and an outside of the sealing body to communicate with each other and a non-opening wall lacking the communication hole, and a width of the welded layer at the opening wall is smaller than a width of the welded layer at the non-opening wall when viewed from the first direction.

In this power storage module, the width of the welded layer at the opening wall provided with the through hole for communication between the internal space and the outside of the sealing body is smaller than the width of the welded layer at the non-opening wall lacking the communication hole when viewed from the first direction. The through hole is formed by, for example, a plate as a hole forming member being inserted into the through hole provided in the first sealing portion, the second sealing portion being formed in this state, and then the plate being pulled out of the sealing body. In this case, the position of the through hole can be defined by the plate being inserted, and thus it is possible to prevent the formation position of the through hole from deviating from the design. In addition, the width of the welded layer at the opening wall is small, and thus it is possible to suppress the molten part of the first sealing portion becoming burrs and adhering to the plate when the protruding parts of the first sealing portion are welded to each other in advance. Accordingly, in the power storage module, it is possible to form the second sealing portion without removing the plate used for the protruding parts of the first sealing portion to be welded to each other in advance and it is possible to avoid an increase in complexity in terms of manufacturing process. Meanwhile, the sufficient width of the welded layer is ensured at the non-opening wall, and thus the sealing performance of the sealing body can be ensured.

A power storage module according to one aspect of the present disclosure includes: an electrode laminate body having a plurality of electrodes laminated in a first direction; a separator containing an electrolyte and arranged in an internal space formed between the electrodes adjacent to each other in the electrode laminate body; and a sealing body provided on an outer peripheral portion of the electrode laminate body and sealing the internal space, in which the plurality of electrodes include a bipolar electrode having a positive electrode active material layer on one surface of a current collector and having a negative electrode active material layer on the other surface of the current collector, the sealing body includes first sealing portions and a second sealing portion, the first sealing portion is joined to an edge portion of a current collector of each of the plurality of electrodes and has a protruding part protruding outward beyond the edge portion of the current collector, the second sealing portion is provided so as to cover an outer periphery of the first sealing portion on a side surface of the electrode laminate body extending in the first direction, the sealing body has a welded layer where the protruding parts of the first sealing portions adjacent to each other in the first direction are welded to each other and has an opening wall provided with a communication hole allowing the internal space and an outside of the sealing body to communicate with each other and a non-opening wall lacking the communication hole, and the welded layer is provided at the non-opening wall and is not provided at the opening wall.

In this power storage module, the non-opening wall lacking the communication hole for communication between the internal space and the outside of the sealing body is provided with the welded layer and the opening wall provided with the communication hole lacks the welded layer. The through hole is formed by, for example, a plate as a hole forming member being inserted into the through hole provided in the first sealing portion, the second sealing portion being formed in this state, and then the plate being pulled out of the sealing body. In this case, the position of the through hole can be defined by the plate being inserted, and thus it is possible to prevent the formation position of the through hole from deviating from the design. In addition, the opening wall lacks the welded layer, and thus it is possible to suppress the molten part of the first sealing portion becoming burrs and adhering to the plate when the protruding parts of the first sealing portion are welded to each other in advance. Accordingly, in the power storage module, it is possible to form the second sealing portion without removing the plate used for the protruding parts of the first sealing portion to be welded to each other in advance and it is possible to avoid an increase in complexity in terms of manufacturing process. Meanwhile, the non-opening wall is provided with the welded layer, and thus the sealing performance of the sealing body can be ensured.

The opening wall may be provided with an opening region where the through hole is disposed and a non-opening region where the through hole is not disposed, and the width of the welded layer in the non-opening region may be larger than the width of the welded layer in the opening region when viewed from the first direction. In this case, it is possible to accurately position the electrode laminate body in a mold by causing the non-opening region to abut against a positioning block or the like in disposing the electrode laminate body in the mold during the formation of the second sealing portion. As a result, the dimensional accuracy of the second sealing portion can be improved. In addition, by the first sealing portion being sufficiently welded in the non-opening region, it is possible to sufficiently increase the in-plane-direction rigidity of the first sealing portion in the non-opening region with respect to the in-plane-direction rigidity of the first sealing portion in the opening region without changing a resin material.

Advantageous Effects of Invention

According to the present disclosure, it is possible to sufficiently ensure the sealing performance of the sealing body without an increase in complexity in terms of manufacturing process.

DESCRIPTION OF EMBODIMENTS

Hereinafter, a preferred embodiment of a power storage module according to one aspect of the present disclosure will be described in detail with reference to the drawings.

Figure 1:
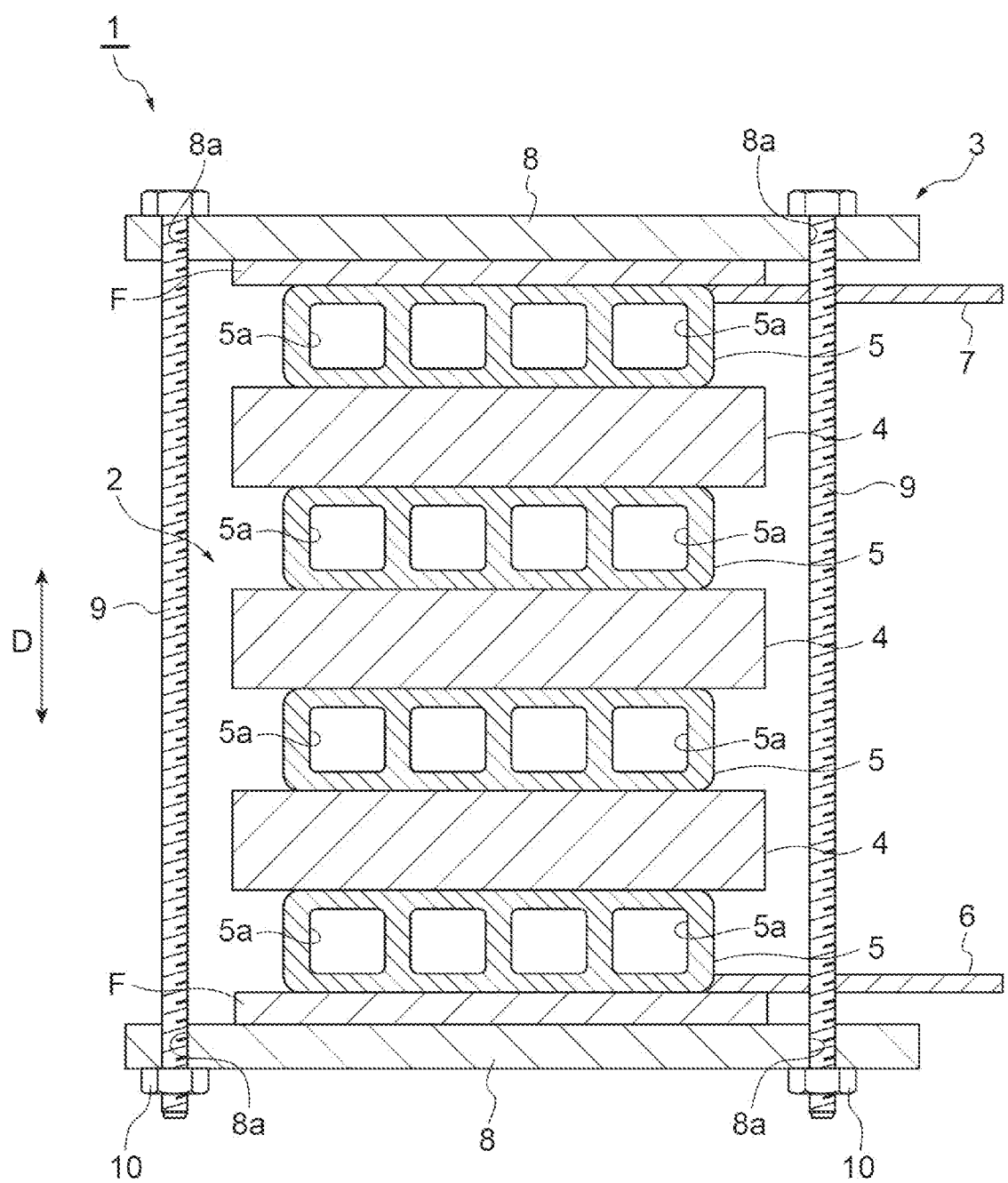
FIG. 1 is a schematic cross-sectional view illustrating a power storage device configured to include the power storage module according to the present embodiment.

FIG. 1 is a schematic cross-sectional view illustrating an embodiment of a power storage device. A power storage device illustrated in FIG. 1 is used as, for example, a battery for various vehicles such as forklifts, hybrid cars, and electric cars. The power storage device 1 includes a module laminate body 2 including a plurality of laminated power storage modules 4 and a restraining member 3 applying a restraining load to the module laminate body 2 in a lamination direction (first direction) D of the module laminate body 2.

The module laminate body 2 includes the plurality of (three here) power storage modules 4 and a plurality of (four here) conductive plates 5. The conductive plate 5 is formed of a metal material with superior conductivity such as aluminum and iron, or a conductive resin. The power storage module 4 is a bipolar battery and has a rectangular shape when viewed from the lamination direction D. The power storage module 4 is, for example, a secondary battery such as a nickel-hydrogen secondary battery and a lithium-ion secondary battery, or an electric double layer capacitor. A nickel-hydrogen secondary battery will be exemplified in the following description.

The power storage modules 4 adjacent to each other in the lamination direction D are electrically connected to each other via the conductive plate 5. The conductive plates 5 are disposed between the power storage modules 4 adjacent to each other in the lamination direction D and outside the power storage modules 4 positioned at the lamination ends. A positive electrode terminal 6 is connected to the conductive plate 5 that is disposed outside the power storage module 4 positioned at one of the lamination ends. A negative electrode terminal 7 is connected to the conductive plate 5 that is disposed outside the power storage module 4 positioned at the other lamination end. The positive electrode terminal 6 and the negative electrode terminal 7 are, for example, drawn out of the edge portions of the conductive plates 5 in a direction intersecting with the lamination direction D. The positive electrode terminal 6 and the negative electrode terminal 7 charge and discharge the power storage device 1. It should be noted that the power storage modules 4 may be disposed at one end and the other end in the lamination direction D in the power storage device 1. In other words, the outermost layers of the laminate body of the power storage modules 4 and the conductive plates 5 in the module laminate body 2 (the outermost layers of the stack) may be the power storage modules 4. In this case, the positive electrode terminal 6 and the negative electrode terminal 7 are provided with respect to the power storage modules 4 that are the outermost layers of the stack.

The conductive plate 5 is provided with a plurality of flow paths 5a through which a cooling fluid such as cooling water and cooling air flows. The flow path 5a extends along, for example, the direction that intersects with (is orthogonal to) each of the lamination direction D and the direction in which the positive electrode terminal 6 and the negative electrode terminal 7 are drawn out. The conductive plate 5 has a function as a heat sink that dissipates heat generated by the power storage module 4 by causing a cooling fluid to flow through the flow paths 5a as well as a function as a connecting member that electrically connects the power storage modules 4 to each other. It should be noted that the area of the conductive plate 5 may be equal to the area of the power storage module 4 or may be larger than the area of the power storage module 4 from the viewpoint of heat dissipation improvement although the area of the conductive plate 5 viewed from the lamination direction D is smaller than the area of the power storage module 4 in the example of FIG. 1.

The restraining member 3 is configured by a pair of end plates 8 that sandwich the module laminate body 2 in the lamination direction D and fastening bolts 9 and nuts 10 that fasten the end plates 8 to each other. The end plate 8 is a rectangular plate-shaped member having an area one size larger than the areas of the power storage module 4 and the conductive plate 5 viewed from the lamination direction D. The end plate 8 is formed of, for example, a highly rigid metal material or resin material capable of withstanding a restraining load. In a case where the end plate 8 is formed of a metal material, an insulating member F having electric insulation is provided on the surface of the end plate 8 that is on the module laminate body 2 side. The insulating member F is made of, for example, an insulating resin formed in a thin film shape or a plate shape. The space between the end plate 8 and the conductive plate 5 is insulated by the insulating member F being disposed in this manner. It should be noted that the insulating member F is disposed between the restraining member 3 and the power storage module 4 in a case where the outermost layer of the stack is the power storage module 4.

In the edge portion of the end plate 8, an insertion hole 8a is provided at a position outside the module laminate body 2. The fastening bolt 9 is passed from the insertion hole 8a of one of the end plates 8 toward the insertion hole 8a of the other end plate 8, and the nut 10 is screwed at the tip part of the fastening bolt 9 protruding from the insertion hole 8a of the end plate 8. As a result, the power storage module 4 and the conductive plate 5 are sandwiched by the end plate 8 and unitized as the module laminate body 2 and a restraining load is applied in the lamination direction D to the module laminate body 2.

Figure 2:
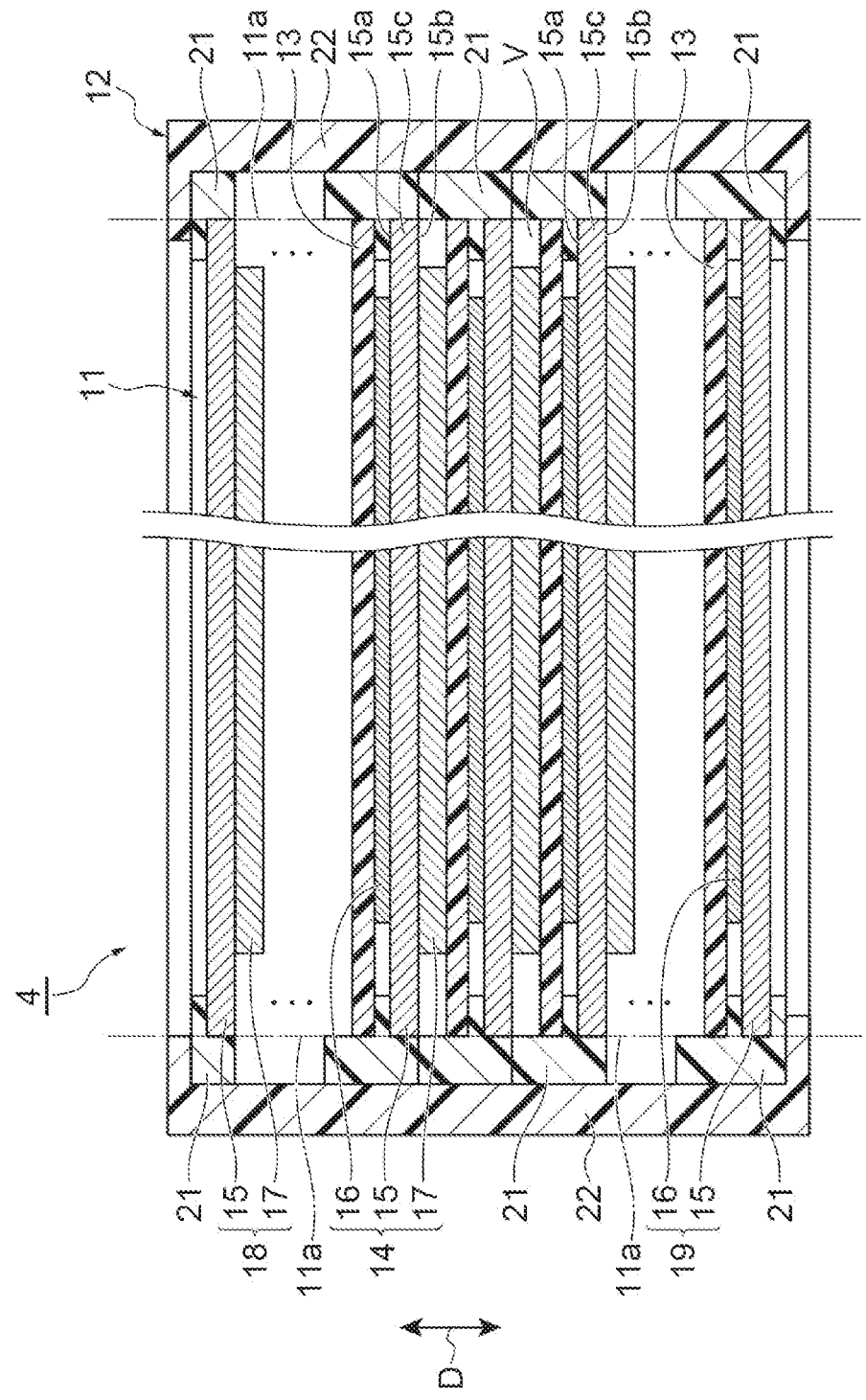
FIG. 2 is a schematic cross-sectional view illustrating the internal configuration of the power storage module.

Next, the configuration of the power storage module 4 will be described in detail. FIG. 2 is a schematic cross-sectional view illustrating the internal configuration of the power storage module illustrated in FIG. 1. As illustrated in FIG. 2, the power storage module 4 includes an electrode laminate body 11 and a resinous sealing body 12 sealing the electrode laminate body 11. The electrode laminate body 11 is configured by a plurality of electrodes laminated along the lamination direction D of the power storage module 4 via a separator 13. The electrodes include a laminate body of a plurality of bipolar electrodes 14, a negative electrode termination electrode 18, and a positive electrode termination electrode 19.

The bipolar electrode 14 includes an electrode plate (current collector) 15 including a first surface 15a facing one side in the lamination direction D and a second surface 15b facing the opposite side in the lamination direction D. A positive electrode 16 is provided on the first surface 15a, which is one surface of the electrode plate 15, and a negative electrode 17 is provided on the second surface 15b, which is the other surface of the electrode plate 15. The positive electrode 16 includes a positive electrode active material layer provided on the first surface 15a of the electrode plate 15. The negative electrode 17 includes a negative electrode active material layer provided on the second surface 15b of the electrode plate 15. In the electrode laminate body 11, the positive electrode 16 of one bipolar electrode 14 faces the negative electrode 17 of another bipolar electrode 14 adjacent on one side in the lamination direction D across the separator 13. In the electrode laminate body 11, the negative electrode 17 of one bipolar electrode 14 faces the positive electrode 16 of another bipolar electrode 14 adjacent on the other side in the lamination direction D across the separator 13.

The negative electrode termination electrode 18 has the electrode plate 15 and the negative electrode 17 including the negative electrode active material layer provided on one surface of the electrode plate 15. In the present embodiment, no active material layer is formed on the first surface 15a of the electrode plate 15 of the negative electrode termination electrode 18 and the negative electrode 17 including the negative electrode active material layer is provided on the second surface 15b. The negative electrode termination electrode 18 is disposed at one end of the electrode laminate body 11 in the lamination direction D such that the negative electrode 17 provided on one surface of the electrode plate 15 faces the positive electrode 16 of the bipolar electrode 14 adjacent in the lamination direction D across the separator 13. The first surface 15a of the electrode plate 15 of the negative electrode termination electrode 18, where no active material layer is provided, constitutes one external terminal surface of the electrode laminate body 11 in the lamination direction D and is electrically connected to one conductive plate 5 (see FIG. 1) adjacent to the power storage module 4.

The positive electrode termination electrode 19 has the electrode plate 15 and the positive electrode 16 including the positive electrode active material layer provided on one surface of the electrode plate 15. In the present embodiment, the positive electrode 16 including the positive electrode active material layer is provided on the first surface 15a of the electrode plate 15 of the positive electrode termination electrode 19 and no active material layer is formed on the second surface 15b. The positive electrode termination electrode 19 is disposed at the other end of the electrode laminate body 11 in the lamination direction D such that the positive electrode 16 provided on one surface of the electrode plate 15 faces the negative electrode 17 of the bipolar electrode 14 adjacent in the lamination direction D across the separator 13. The second surface 15b of the electrode plate 15 of the positive electrode termination electrode 19, where no active material layer is provided, constitutes the other external terminal surface of the electrode laminate body 11 in the lamination direction D and is electrically connected to the other conductive plate 5 (see FIG. 1) adjacent to the power storage module 4.

As the electrode plate 15, for example, a metal foil such as a nickel foil, a nickel-plated steel foil, and a stainless steel foil, or a metal plate can be used. As an example, in the present embodiment, a rectangular metal foil made of nickel is used for the electrode plate 15. An edge portion 15c of the electrode plate 15 is provided with a rectangular frame-shaped uncoated region lacking positive and negative electrode active materials. As the positive electrode active material that constitutes the positive electrode 16, for example, nickel hydroxide is mentioned. As the negative electrode active material that constitutes the negative electrode 17, for example, a hydrogen storage alloy is mentioned. In the present embodiment, the information region of the negative electrode 17 on the second surface 15b of the electrode plate 15 is one size larger than the formation region of the positive electrode 16 on the first surface 15a of the electrode plate 15.

The separator 13 is formed in, for example, a sheet shape. Examples of the separator 13 include a porous film made of a polyolefin-based resin such as polyethylene (PE) and polypropylene (PP) and a woven or non-woven fabric made of polypropylene, methyl cellulose, or the like. The separator 13 may be reinforced with a vinylidene fluoride resin compound.

The sealing body 12 is a member that prevents liquid entanglement attributable to electrolytic solution leakage and prevents the adjacent bipolar electrodes 14 from coming into contact with each other and causing a short circuit. As the sealing body 12 in an alkaline battery, for example, an insulating resin having alkali resistance is used. The sealing body 12 covers the edge portion 15c of each electrode plate 15 laminated in the lamination direction D and also functions as a case holding the electrode laminate body 11. The sealing body 12 holds the edge portion 15c on a side surface 11a. The sealing body 12 has first sealing portions 21 provided along the edge portions 15c of the electrode plates 15 so as to surround the active material layers (positive and negative electrode active material layers) formed in the middle of the electrode plates 15. In addition, the sealing body 12 has a second sealing portion 22 surrounding the first sealing portion 21 from the outside along the side surface 11a of the electrode laminate body 11 and joined to each first sealing portion 21. Examples of the constituent materials of the first sealing portion 21 and the second sealing portion 22 include polypropylene (PP), polyphenylene sulfide (PPS), and modified polyphenylene ether (modified PPE).

The first sealing portion 21 is continuously provided over the entire circumference of the uncoated region of the edge portion 15c on the first surface 15a of the rectangular electrode plate 15 and has a rectangular frame shape when viewed from the lamination direction D. In the present embodiment, the first sealing portion 21 is provided with respect to the electrode plate 15 of the negative electrode termination electrode 18 and the electrode plate 15 of the positive electrode termination electrode 19 as well as the electrode plate 15 of the bipolar electrode 14. As for the negative electrode termination electrode 18, the first sealing portion 21 is provided on the edge portion 15c of the first surface 15a of the electrode plate 15. As for the positive electrode termination electrode 19, the first sealing portion 21 is provided on the edge portions 15c of the first surface 15a and the second surface 15b of the electrode plate 15.

The first sealing portion 21 is airtightly joined (welded) to the first surface 15a of the electrode plate 15 by, for example, heat fusion or ultrasonic fusion. The first sealing portion 21 is, for example, a film having a predetermined thickness in the lamination direction D. In the first sealing portion 21, the inside part that is joined to the edge portion 15c of the electrode plate 15 is positioned between the edge portions 15c of the electrode plates 15 adjacent to each other in the lamination direction D. In the first sealing portion 21, the outside part that is not joined to the edge portion 15c of the electrode plate 15 is a protruding part that projects outward beyond the edge of the electrode plate 15. This protruding part is joined to the second sealing portion 22. The protruding parts of the first sealing portions 21 adjacent to each other in the lamination direction D are joined (welded) to each other by, for example, hot plate fusion.

The region where the electrode plate 15 and the first sealing portion 21 overlap is the region where the electrode plate 15 and the first sealing portion 21 are joined to each other. In the joint region, the surface of the electrode plate 15 is roughened. Although only the joint region may be the roughened region, the entire surface of the electrode plate 15 is roughened in the present embodiment. The roughening can be realized by, for example, a plurality of protrusions being formed by electroplating. By the plurality of protrusions being formed, a molten resin enters between the plurality of protrusions formed as a result of the roughening at the joint interface between the electrode plate 15 and the first sealing portion 21 and an anchor effect is exhibited. As a result, the joining strength between the electrode plate 15 and the first sealing portion 21 can be improved. The protrusion that is formed during the roughening is, for example, an overhang-shaped minute protrusion having the projecting portion formed on the surface of the electrode plate 15 as a base end. It is possible to enhance the anchor effect by forming such minute protrusions.

The second sealing portion 22 is provided outside the electrode laminate body 11 and the first sealing portion 21. The second sealing portion 22 is formed by, for example, resin injection molding in a state where the electrode laminate body 11 provided with the first sealing portion 21 is disposed as an insert in a mold. The second sealing portion 22 extends over the entire length of the electrode laminate body 11 along the lamination direction D. The second sealing portion 22 has a rectangular tube shape extending with the lamination direction D as an axial direction. The second sealing portion 22 is welded to the outer edge part of the first sealing portion 21 by, for example, heat during the injection molding.

The first sealing portion 21 and the second sealing portion 22 form an internal space V between the adjacent electrodes and seal the internal space V. More specifically, together with the first sealing portion 21, the second sealing portion 22 provides sealing between the bipolar electrodes 14 adjacent to each other along the lamination direction D, between the negative electrode termination electrode 18 and the bipolar electrode 14 adjacent to each other along the lamination direction D, and between the positive electrode termination electrode 19 and the bipolar electrode 14 adjacent to each other along the lamination direction D. As a result, the airtightly partitioned internal space V is formed between the adjacent bipolar electrodes 14, between the negative electrode termination electrode 18 and the bipolar electrode 14, and between the positive electrode termination electrode 19 and the bipolar electrode 14. The internal space V contains, for example, an alkaline solution such as an aqueous potassium hydroxide solution or a gel electrolyte in which an electrolytic solution is held by a polymer. The separator 13, the positive electrode 16, and the negative electrode 17 are impregnated with an electrolyte such as an electrolytic solution and a gel electrolyte.

Figure 3:
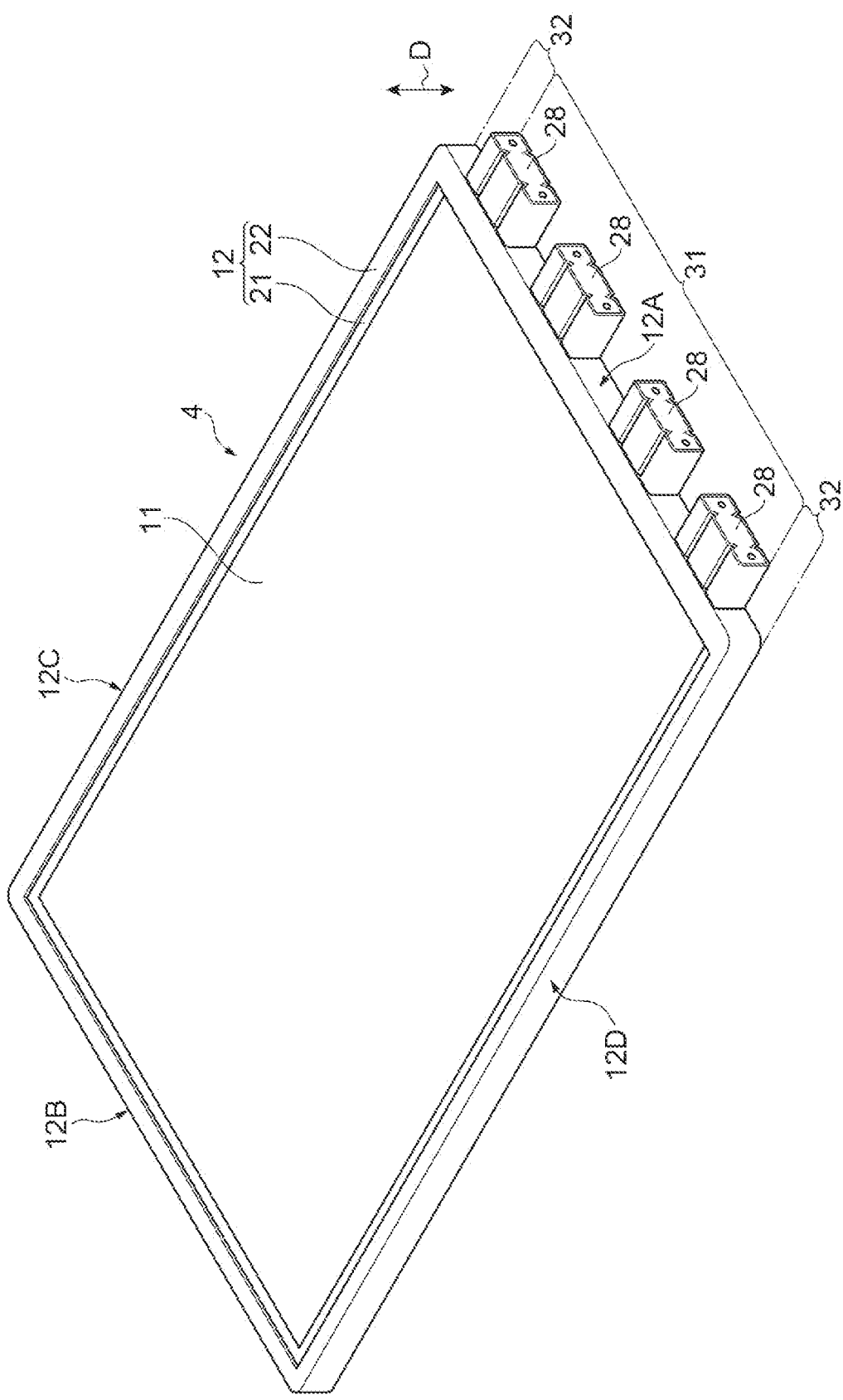
FIG. 3 is a perspective view illustrating the external configuration of the power storage module.

FIG. 3 is a perspective view illustrating the external configuration of the power storage module. As illustrated in FIG. 3, the outer wall part of the power storage module 4 of is configured by the sealing body 12. The sealing body 12 has four side surfaces 12A to 12D corresponding to the side surface 11a (see FIG. 2) of the electrode laminate body 11. Each of the side surfaces 12A to 12D is a surface extending along the lamination direction D of the electrode laminate body 11. In the example of FIG. 3, the power storage module 4 is rectangular when viewed from the lamination direction D. The side surfaces 12A and 12B are surfaces on the short side as viewed from the lamination direction D, and the side surfaces 12C and 12D are surfaces on the long side as viewed from the lamination direction D.

Figure 4:
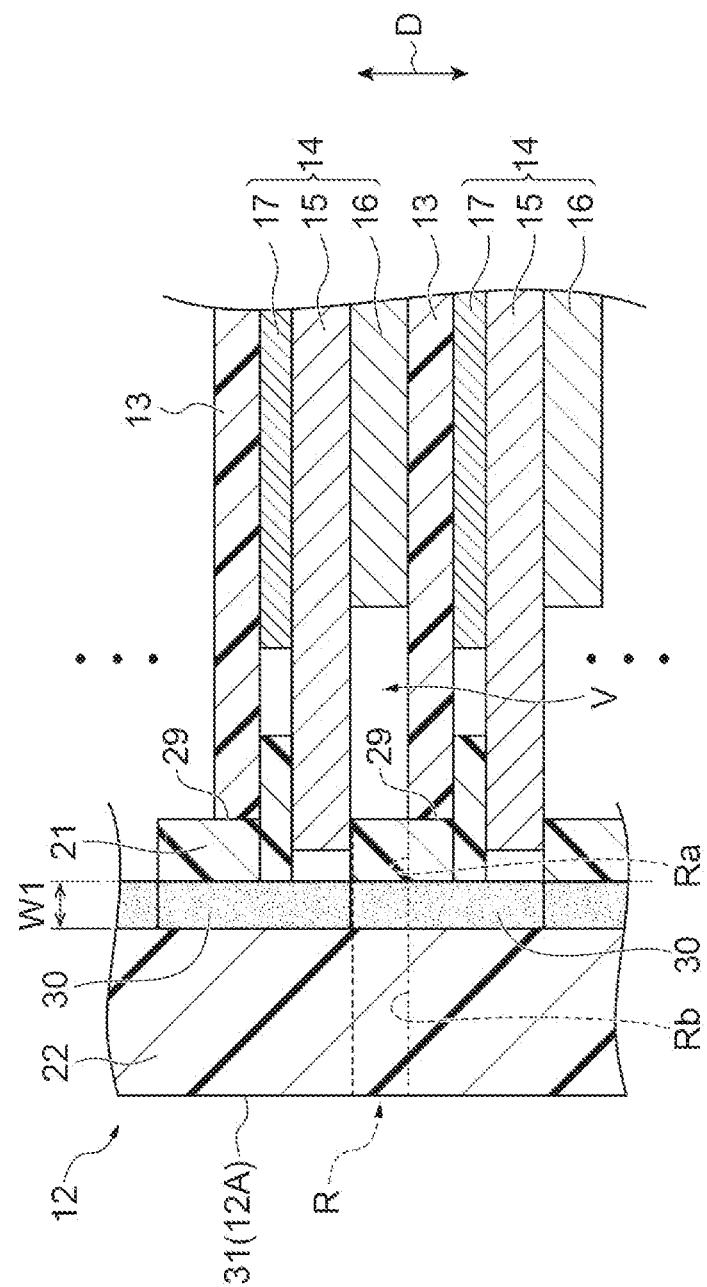
FIG. 4 is an enlarged cross-sectional view of a main part illustrating the internal configuration of the power storage module on the side surface side where a pressure regulating valve is disposed.

Of the side surfaces 12A to 12D, the side surface 12A is provided with a plurality of (four here) pressure regulating valves 28 provided at predetermined intervals. The pressure regulating valve 28 regulates the pressure of the internal space V by releasing the gas in the internal space V to the outside of the power storage module 4. As illustrated in FIG. 4, on the side surface 12A side where the pressure regulating valve 28 is provided, a through hole R communicating with the pressure regulating valve 28 and the internal space V is provided in the sealing body 12. In other words, the side surface 12A of the sealing body 12 is configured by an opening wall provided with the through hole R and the side surfaces 12B to 12D of the sealing body 12 are configured by non-opening walls lacking the through hole R. It should be noted that the pressure regulating valve 28 is omitted in FIG. 4.

The through hole R is configured by, for example, a through hole Ra provided in the first sealing portion 21 and a through hole Rb provided in the second sealing portion 22 so as to correspond to the through hole Ra. The through hole R is formed by, for example, a plate 35 (see FIG. 8) as a hole forming member being inserted in advance into the through hole Ra provided in the first sealing portion 21 of the electrode laminate body 11 when the second sealing portion 22 is injection-molded and the plate 35 being pulled out of the sealing body 12 after the second sealing portion 22 is molded. The through hole R also functions as a liquid injection port for injecting an electrolytic solution into the internal space V in the process of manufacturing the power storage module 4. The through hole R is sealed after the injection of the electrolytic solution. In the present embodiment, an opening region 31 where the through hole R is disposed (the pressure regulating valve 28 is disposed) and a non-opening region 32 where the through hole R is not disposed (the pressure regulating valve 28 is not disposed) are alternately provided on the side surface 12A (see FIG. 3).

The sealing body 12 has a welded layer 30 formed by the first sealing portions 21 adjacent to each other in the lamination direction D being welded by hot plate welding or the like. A width W of the welded layer 30 as viewed from the lamination direction D is different between the side surface 12A side where the through hole R is provided and the side surface 12B to 12D side where the through hole R is not provided. Specifically, in the present embodiment, the first sealing portion 21 has a step portion 29 where the separator 13 is placed as illustrated in FIG. 4. The step portion 29 is formed by, for example, the outer edge part of the first sealing portion 21 being folded back to the inner edge side in the process of manufacturing the power storage module 4. Here, the width W of the welded layer 30 is the length of the melt-solidified part that is formed on the outer edge side (second sealing portion 22 side) of the first sealing portion 21 by hot plate fusion. In a case where the hot plate fusion is performed, the length of projection of the outer edge part of the first sealing portion 21 from the edge of the electrode plate 15 decreases as a result of resin material penetration. Accordingly, the width W of the welded layer 30 is the length of the melt-solidified part from the outer edge of the first sealing portion 21 after hot plate fusion is performed until the length of projection of the outer edge part of the first sealing portion 21 reaches a fixed size from the initial value.

Figure 5:
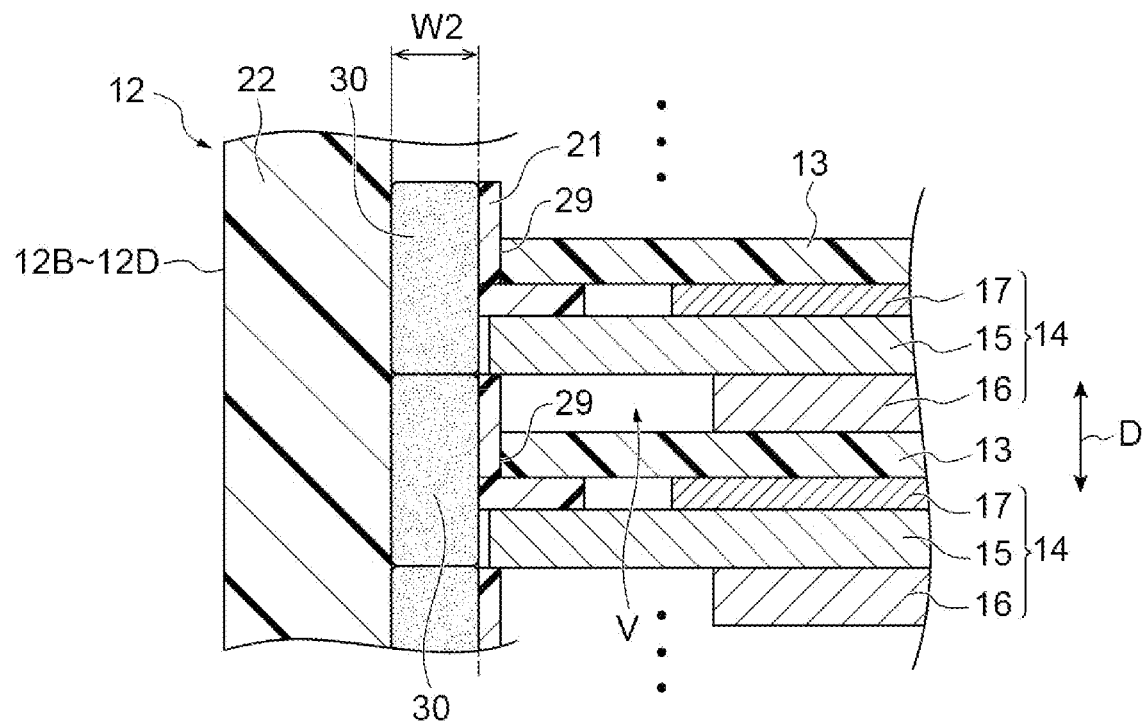
FIG. 5($a$) is an enlarged cross-sectional view of a main part illustrating the internal configuration of the power storage module on the side surface side where the pressure regulating valve is not disposed, and FIG. 5($b$) is an enlarged cross-sectional view of a main part illustrating the internal configuration of the power storage module at a part that corresponds to a non-opening region.
Figure 5:
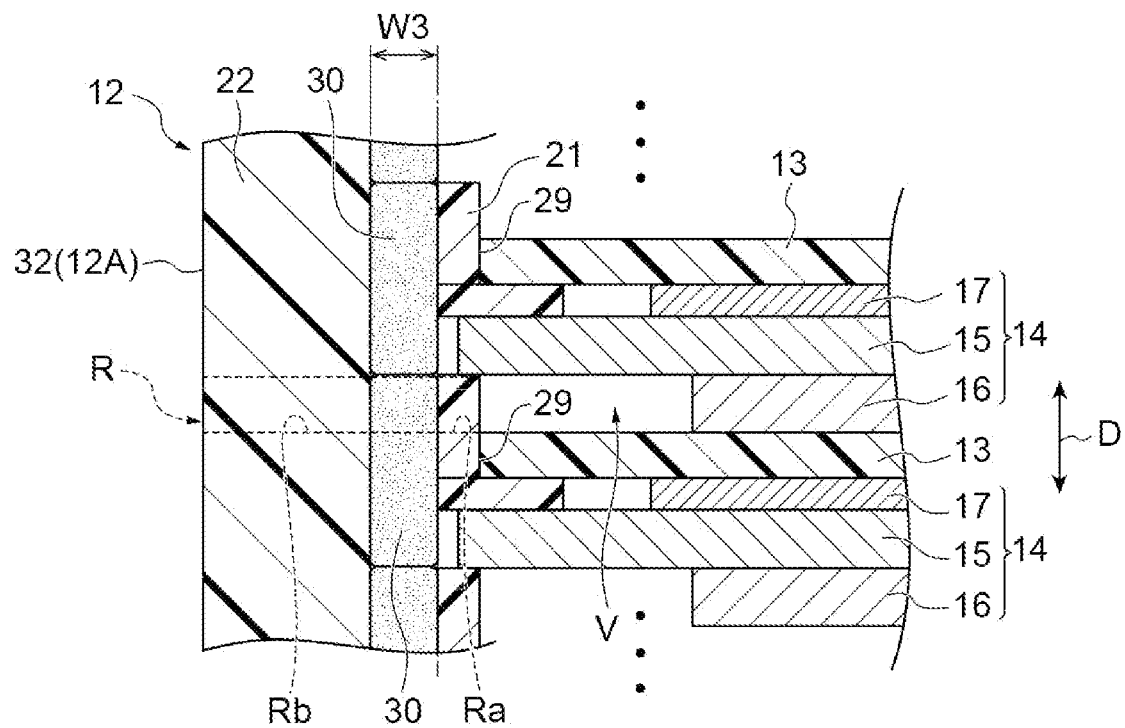

In the present embodiment, a width W1 of the welded layer 30 on the side surface 12A side (see FIG. 4) is smaller than a width W2 of the welded layer 30 on the side surface 12B to 12D side (see FIG. 5(a)). In a case where the width W2 is 0.5 mm to 1.0 mm, the width W1 is set to, for example, 0.2 mm or less. The widths W1 and W2 can be regulated depending on the conditions such as the temperature and duration of the hot plate fusion. It should be noted that the welded layer 30 may be provided only on the side surface 12B to 12D side configured by the non-opening walls without being provided on the side surface 12A side configured by the opening wall. In other words, hot plate fusion may not be performed on the edge of the first sealing portion 21 on the side surface 12A side and the width W1 of the welded layer 30 may be 0 mm.

At the edge of the first sealing portion 21 on the side surface 12A side, the in-plane-direction rigidity of the part that corresponds to the non-opening region 32 where the through hole R is not disposed may be higher than the in-plane-direction rigidity of the part that corresponds to the opening region 31 where the through hole R is disposed. In the present embodiment, the in-plane-direction rigidity is regulated by the width W of the welded layer 30 being regulated. More specifically, in the present embodiment, a width W3 of the welded layer 30 at the part that corresponds to the non-opening region 32 see FIG. 5(b)) is larger than the width of the welded layer 30 that corresponds to the opening region 31 (that is, the width W1). The width W3 of the welded layer 30 may be equal to the width of the welded layer 30 of the side surfaces 12B to 12D or may be a value between the width W1 and the width W2.

Figure 6:
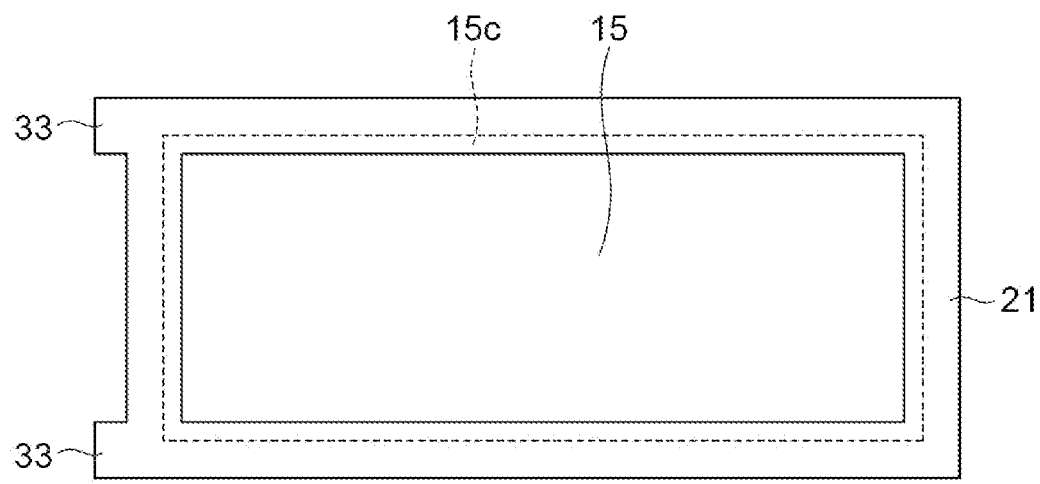
FIGS. 6($a$) and 6($b$) are schematic plan view illustrating a configuration example for ensuring the in-plane-direction rigidity of a first sealing portion of the part corresponding to the non-opening region.
Figure 6:
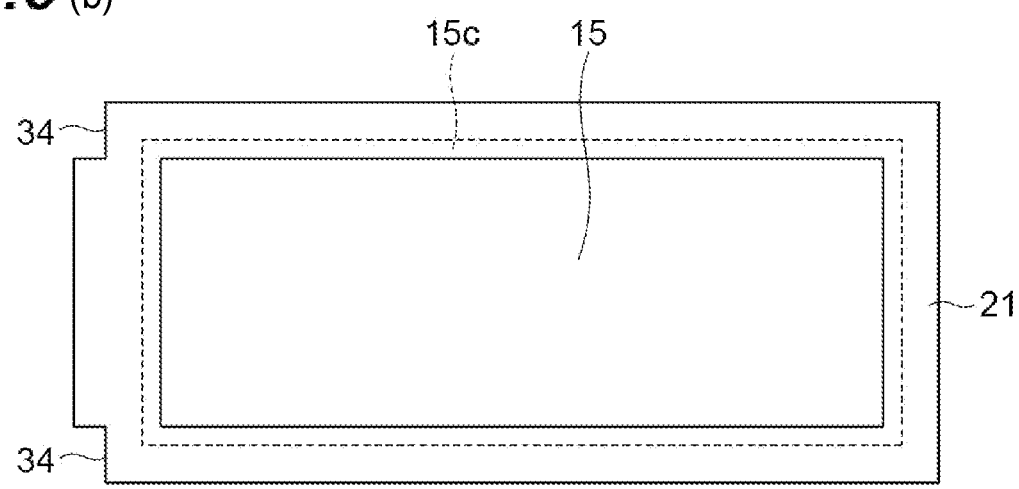

A melting allowance of the first sealing portion 21 is necessary in a case where the in-plane-direction rigidity is regulated by the width W of the welded layer 30 being regulated. For example, as illustrated in FIG. 6(a), a protruding part 33 as a melting allowance may be provided at a position corresponding to the non-opening region 32 in the first sealing portion 21 on which hot plate fusion is yet to be performed. As a result, the resin of the protruding part 33 can be firmly inserted between the first sealing portions 21 adjacent to each other in the lamination direction D. Accordingly, a sufficient rigidity can be ensured for the part corresponding to the non-opening region 32.

In addition, as illustrated in FIG. 6(b), the configuration provided with the protruding part 33 may be replaced with, for example, providing a recess portion 34 that results from hot plate fusion at a position corresponding to the non-opening region 32 in the first sealing portion 21 on which the hot plate fusion has been performed. By more resin being melted in the recess portion 34 than at the other parts, the resin can be firmly inserted between the first sealing portions 21 adjacent to each other in the lamination direction D as in the case of FIG. 6(a). Accordingly, a sufficient rigidity can be ensured for the part corresponding to the non-opening region 32.

Figure 7:
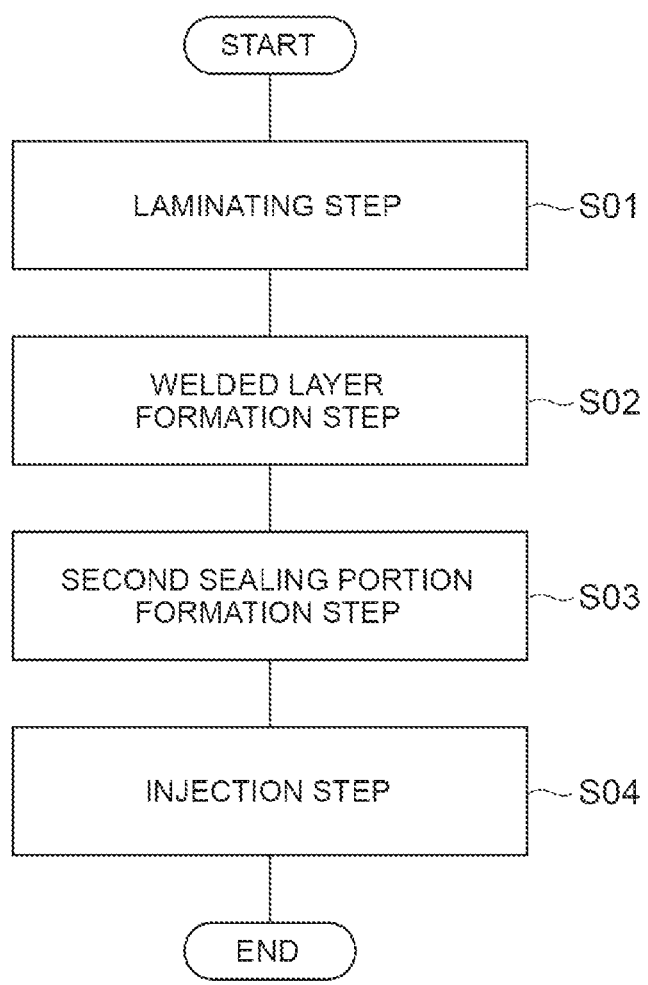
FIG. 7 is a flowchart illustrating a power storage module manufacturing process.

Next, the process for manufacturing the power storage module 4 described above will be described. FIG. 7 is a flowchart illustrating a power storage module manufacturing process. As illustrated in FIG. 7, this manufacturing process is configured to include a laminating step (Step S01), a welded layer forming step (Step S02), a second sealing portion forming step (Step S03), and an injection step (Step S04).

In the laminating step, a laminate body is obtained by the bipolar electrodes 14 being laminated via the separator 13. In addition, the electrode laminate body 11 is obtained by the negative electrode termination electrode 18 and the positive electrode termination electrode 19 being further laminated via the separator 13 at both lamination ends of the laminate body of the bipolar electrodes 14, respectively. The rectangular frame-shaped first sealing portion 21 is joined, by fusion or the like and prior to the lamination, to the edge portions 15c of the electrode plates 15 of the bipolar electrode 14, the negative electrode termination electrode 18, and the positive electrode termination electrode 19. In addition, a recess reaching the outer edge from the inner edge is provided in the side of the first sealing portion 21 on the side surface 12A side and the plate 35 (see FIG. 8) is disposed in the recess. The depth of the recess is, for example, almost equal to the thickness of the folded part of the first sealing portion 21 (thickness of the upper part of the step portion 29). The plate 35 is configured by, for example, a metallic plate. The number of the plates 35 that are disposed is equal to the number of the internal spaces V that are formed in the electrode laminate body 11.

Figure 8:
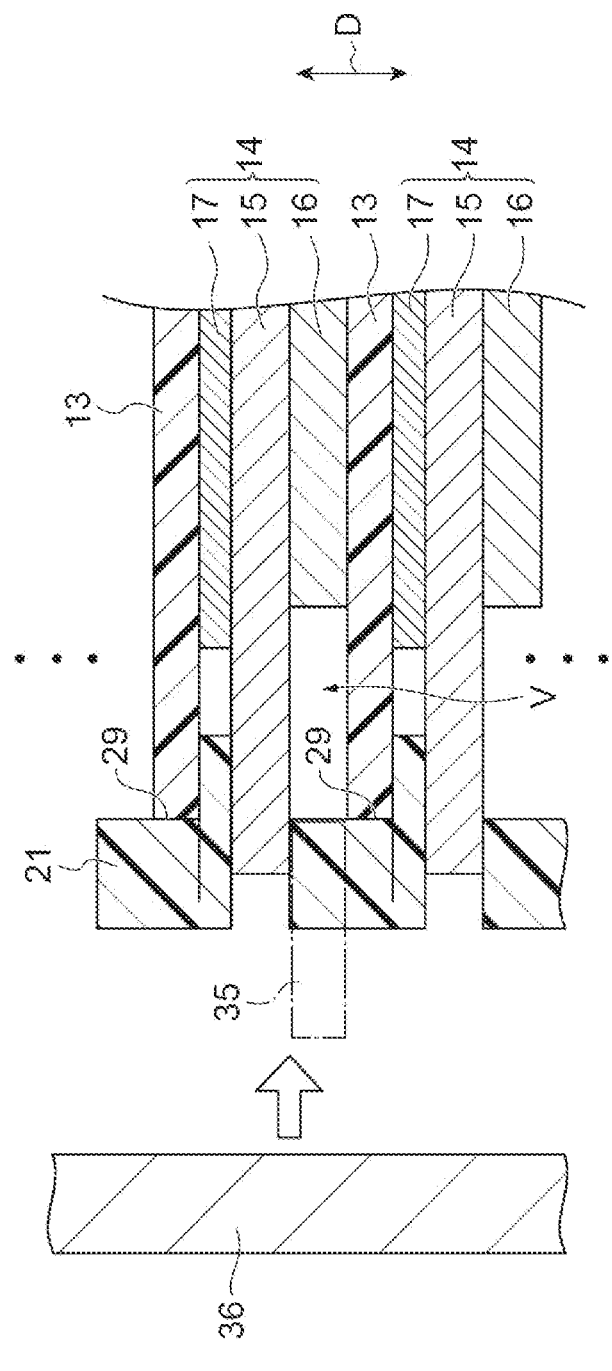
FIG. 8 is a schematic cross-sectional view illustrating a state of pre-fusion of the first sealing portion.

As illustrated in FIG. 8, in the welded layer forming step, the outer edge parts of the first sealing portions 21 adjacent to each other in the lamination direction D are welded to each other by means of a hot plate 36 on the side surface 11a of the electrode laminate body 11. Although FIG. 8 illustrates the fusion of the surface that corresponds to the side surface 12A, the fusion by means of the hot plate 36 is performed on each of the surfaces that correspond to the side surface 12A to 12D sides. At this time, the width W1 of the welded layer 30 on the side surface 12A side is made smaller than the width W2 of the welded layer 30 on the side surface 12B to 12D side by the temperature and duration of the fusion by means of the hot plate 36 being regulated (see FIGS. 4 and 5(a)). In addition, the width W3 of the welded layer 30 at the part that corresponds to the non-opening region 32 is made larger than the width of the welded layer 30 at the part that corresponds to the opening region 31 (that is, the width W1) (see FIGS. 4 and 5(b)).

Figure 9:
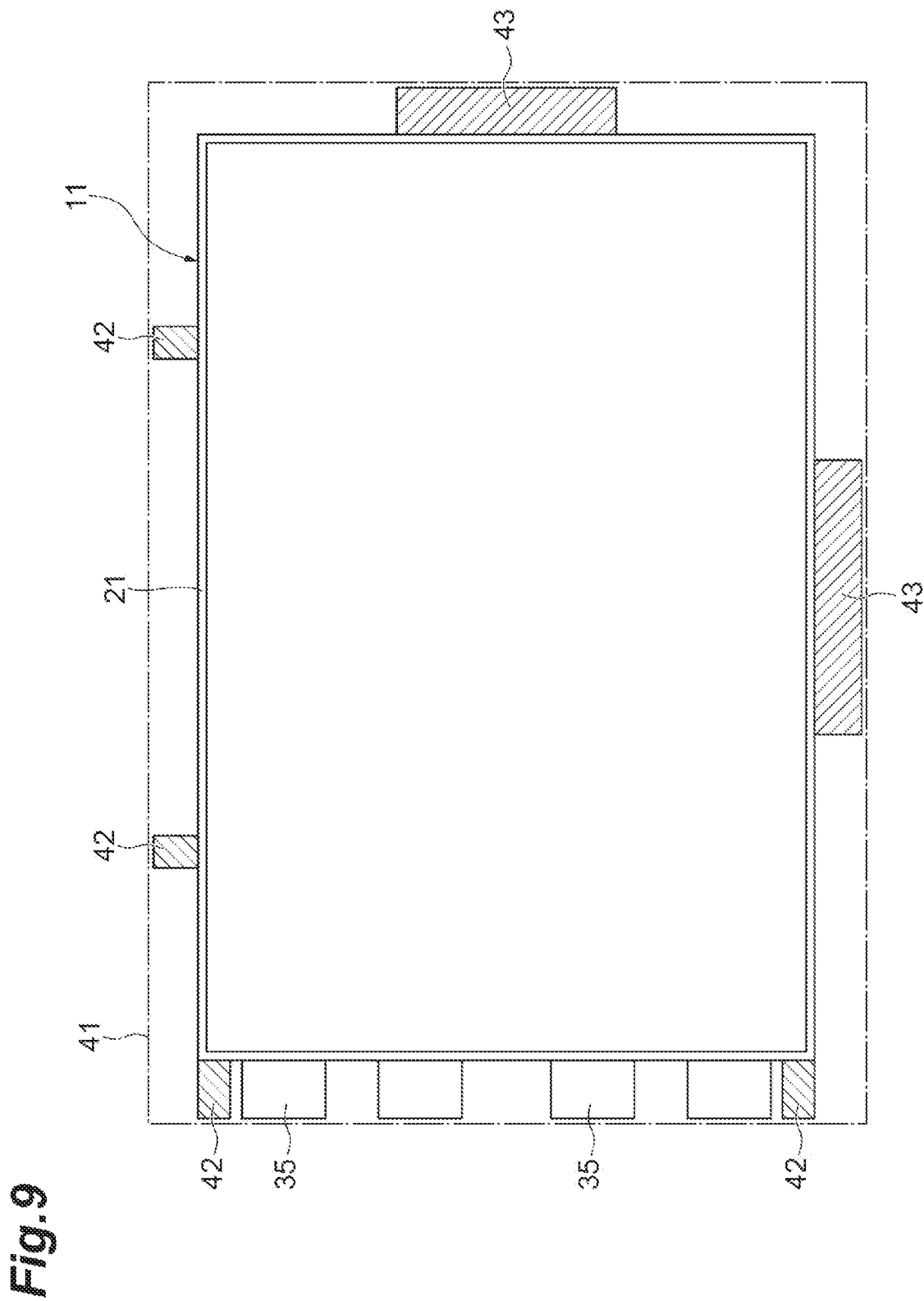
FIG. 9 is a schematic view illustrating a state of positioning of an electrode laminate body in a mold.

In the second sealing portion forming step, the second sealing portion 22 is formed by means of, for example, an injection molding machine. Here, the electrode laminate body 11 where the welded layer 30 is formed on the first sealing portion 21 is disposed in a mold 41 for injection molding with the plate 35 as a hole forming member disposed in the through hole Ra of the first sealing portion 21. When the electrode laminate body 11 is disposed in the mold 41, the electrode laminate body 11 is positioned by means of positioning blocks 42 disposed in the mold 41 as illustrated in, for example, FIG. 9. In this case, the electrode laminate body 11 is pushed into the mold 41 by a pusher 43 and the edge of the first sealing portion 21 on the side surface 12A side and the edge of the first sealing portion 21 on the side surface 12B side are caused to abut against the positioning blocks 42, respectively. At the edge of the first sealing portion 21 on the side surface 12A side, only the part that corresponds to the non-opening region 32 is caused to abut against the positioning block 42. The positioning block 42 and the pusher 43 may be removed from the inside of the mold 41 before resin injection.

After the positioning, the second sealing portion 22 is formed around the first sealing portion 21 by a resin material being poured into the void in the mold 41 from the gate (not illustrated) of the mold 41. After the second sealing portion 22 is formed, the plate 35 is removed from the electrode laminate body 11. As a result, the sealing body 12 that has the through hole R on the side surface 12A side is formed. Examples of the method of removing the plate 35 include pulling, heating, and ultrasonic vibration.

In the injection step, an electrolytic solution is injected into the internal space V through the through hole R of the sealing body 12. After the injection, the internal space V is sealed by the pressure regulating valve 28 being attached to the through hole R and the power storage module 4 is obtained.

As described above, in the power storage module 4, the width W1 of the welded layer 30 on the side surface (opening wall) 12A side provided with the through hole R communicating with the internal space V is smaller than the width W2 of the welded layer 30 on the side surface (non-opening wall) 12B to 12D side. The through hole R is formed by, for example, the plate 35 as a hole forming member being inserted into the through hole Ra provided in the first sealing portion, the second sealing portion 22 being formed in this state, and then the plate 35 being pulled out of the sealing body 12. In this case, the position of the through hole R can be defined by the plate 35 being inserted, and thus it is possible to prevent the formation position of the through hole R from deviating from the design. In addition, the width W1 of the welded layer 30 on the side surface 12A side is small, and thus it is possible to suppress the molten part of the first sealing portion 21 becoming burrs and adhering to the plate 35 when the protruding parts of the first sealing portion 21 are welded to each other in advance. Accordingly, in the power storage module 4, it is possible to form the second sealing portion 22 without removing the plate 35 used for the protruding parts of the first sealing portion 21 to be welded to each other in advance and it is possible to avoid an increase in complexity in terms of manufacturing process. Meanwhile, the sufficient width W2 of the welded layer 30 is ensured on the side surface 12B to 12D side, and thus a sufficient sealing performance can be ensured for the sealing body 12.

In addition, in a case where the welded layer 30 is not provided on the side surface 12A side that is an opening wall, it is possible to more reliably suppress the molten part of the first sealing portion 21 becoming burrs and adhering to the plate 35 when the protruding parts of the first sealing portion are welded to each other in advance.

In addition, in the power storage module 4, the opening region 31 where the through hole R is disposed and the non-opening region 32 where the through hole R is not disposed are provided on the side surface 12A and the width W3 of the welded layer 30 in the non-opening region 32 is larger than the width W1 of the welded layer 30 in the opening region 31 when viewed from the lamination direction D. In this case, the in-plane-direction rigidity of the first sealing portion 21 in the non-opening region 32 can be sufficiently increased with respect to the in-plane-direction rigidity of the first sealing portion 21 in the opening region 31. If the in-plane-direction rigidity of the edge of the first sealing portion 21 is insufficient when the electrode laminate body 11 is caused to abut against the positioning block 42 in the mold 41, it is conceivable that the edge of the first sealing portion 21 is distorted and the accuracy of the positioning by means of the positioning block 42 cannot be sufficiently obtained. In contrast, in the power storage module 4, it is possible to accurately position the electrode laminate body 11 in the mold 41 by increasing the rigidity in the non-opening region 32 and causing only the part to abut against the positioning block 42. As a result, the dimensional accuracy of the second sealing portion 22 can be improved. In addition, by the edge of the first sealing portion 21 being sufficiently penetrated in the non-opening region 32, it is possible to sufficiently increase the in-plane-direction rigidity of the first sealing portion 21 in the non-opening region 32 with respect to the in-plane-direction rigidity of the first sealing portion 21 in the opening region 31 without changing the resin material.

Figure 10:
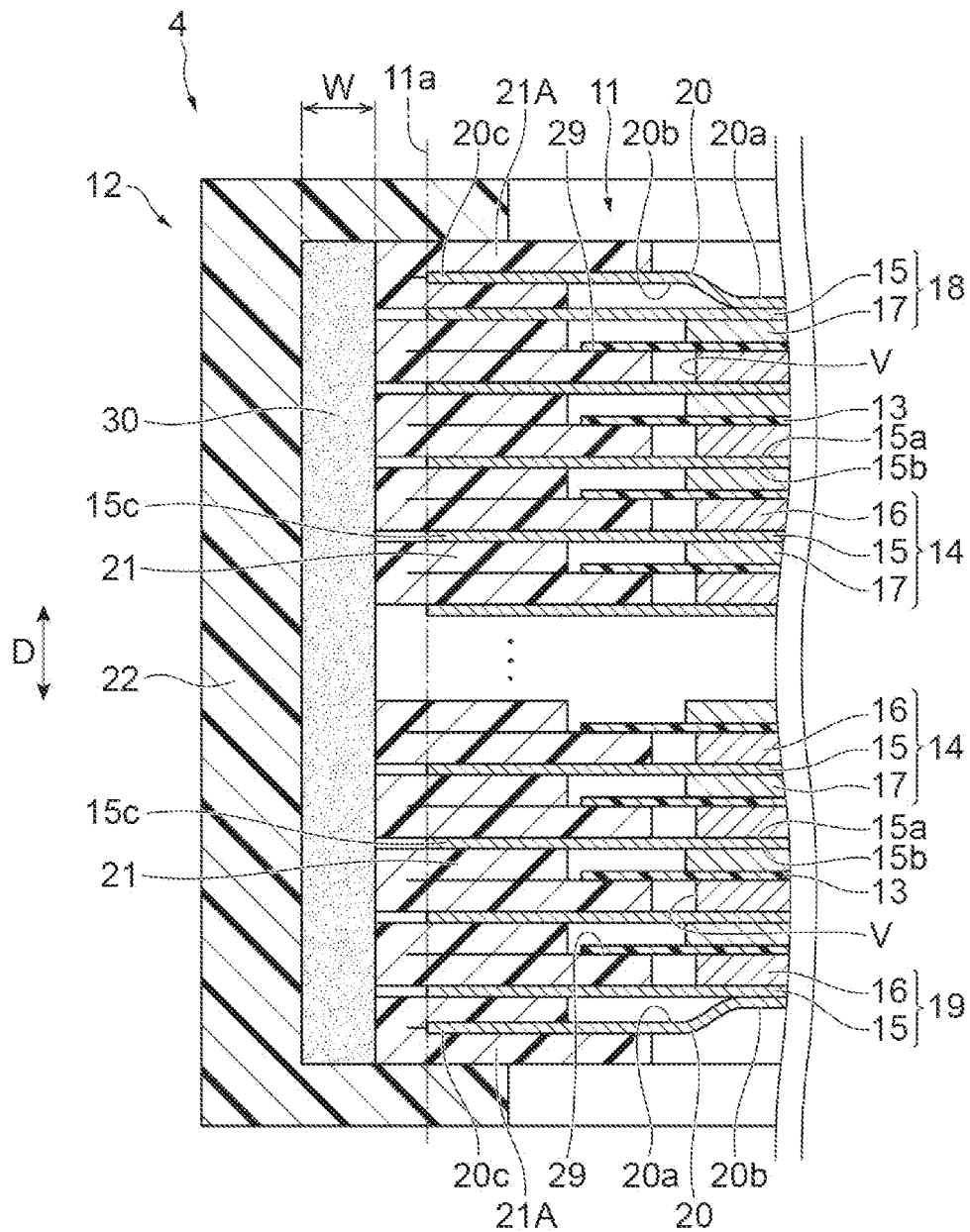
FIG. 10 is a schematic cross-sectional view illustrating a modification example of the internal configuration of the power storage module.

The present disclosure is not limited to the embodiment described above. For example, the internal configuration of the power storage module 4 is not limited to the configuration illustrated in FIG. 2. FIG. 10 is a schematic cross-sectional view illustrating a modification example of the internal configuration of the power storage module. In the example of FIG. 10, the outer edge side of the frame-shaped first sealing portion 21 joined to the edge portion 15c on the first surface 15a side of the electrode plate 15 is folded back inward in each of the bipolar electrodes 14. As a result, a step portion 23 for placing the edge portion of the separator 13 is formed on the inner edge side of the first sealing portion 21. The step portion 23 may be formed by the film that constitutes the lower row being overlaid with the film that constitutes the upper row.

In addition, in the example of FIG. 10, termination conductors 20 are laminated on the outer side of the negative electrode termination electrode 18 in the lamination direction and the outer side of the positive electrode termination electrode 19 in the lamination direction, respectively. The termination conductor 20 is a so-called uncoated conductive member, and neither a positive electrode active material nor a negative electrode active material is provided on both surfaces of the termination conductor 20. The termination conductor 20 is in contact with the external terminal surface of the facing negative electrode termination electrode 18 or positive electrode termination electrode 19 and is electrically connected thereto. A member identical to the electrode plate 15 of the bipolar electrode 14 can be used as the termination conductor 20, and the termination conductor 20 is configured by, for example, a rectangular metal made of nickel, a nickel-plated steel foil, stainless steel foil, or the like. The surface of the termination conductor 20 may be roughened in whole or in part.

As in the case of the electrode plate 15 of the bipolar electrode 14, frame-shaped first sealing portions 21A are joined to edge portions 20c of the termination conductors 20, respectively. The first sealing portions 21A are folded back inward on the outer edge sides and are joined to first surfaces 20a and second surfaces 20b in the edge portions 20c of the termination conductors 20, respectively. The first sealing portion 21A that is joined to the second surface 20b of the termination conductor 20 on the negative electrode termination electrode 18 side is also joined to the first surface 15a of the electrode plate 15 of the negative electrode termination electrode 18. The thickness of the film that constitutes the first sealing portion 21A may be different from the thickness of the film that constitutes the first sealing portion 21. In this case, the joint body of the termination conductor 20 and the first sealing portion 21A also functions as a member regulating the thickness of the electrode laminate body 11 including the first sealing portions 21 and 21A in the lamination direction D.

Figure 11:
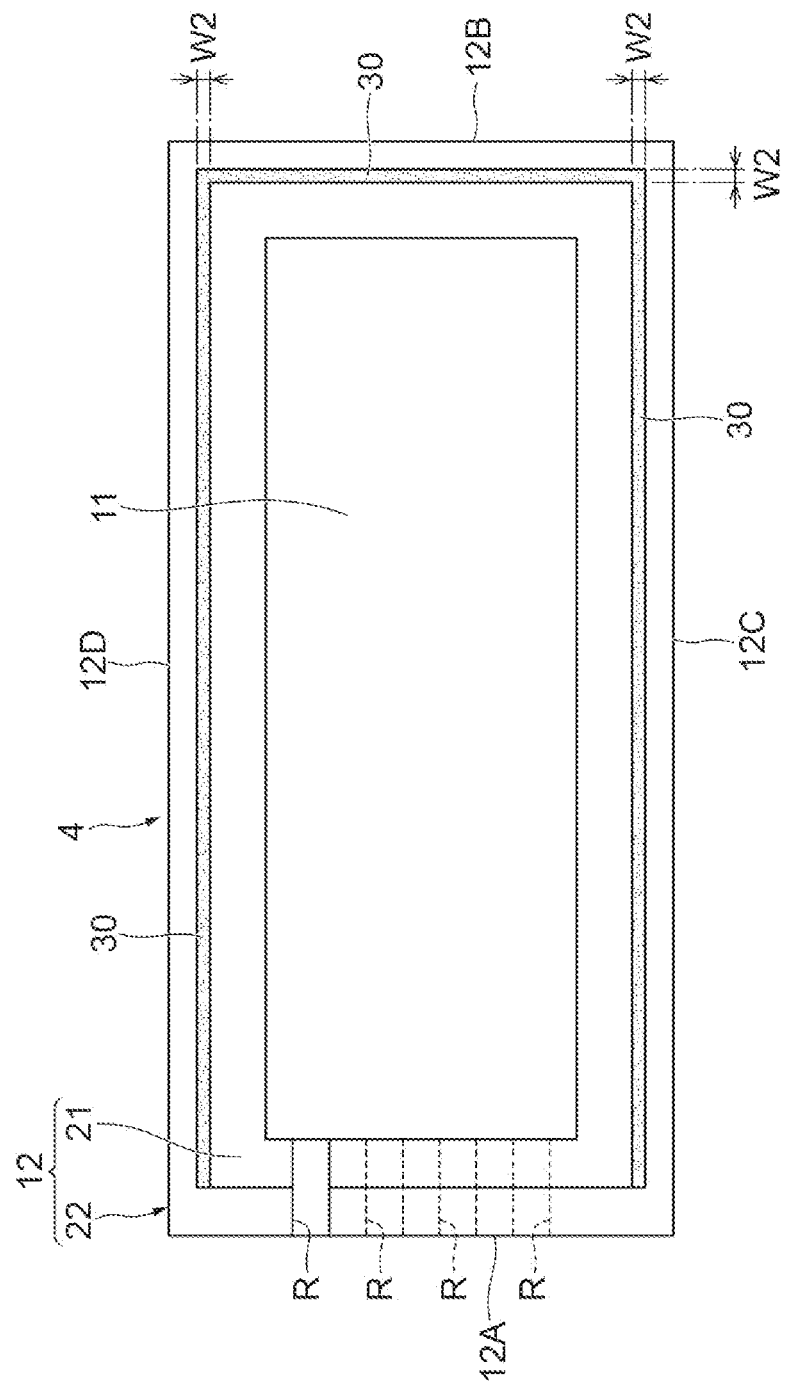
FIG. 11 is a schematic plan view illustrating a modification example of a welded layer.

The outer edge parts of the first sealing portions 21 and 21A are joined to each other by the welded layer 30. As illustrated in FIG. 11, in this modification example, the welded layer 30 is provided only on the side surface 12B to 12D side configured by the non-opening walls. In other words, the width W1 of the welded layer 30 is 0 mm as for the edge of the first sealing portion 21 on the side surface 12A side. By not forming the welded layer 30 on the side surface 12A side, it is possible to avoid the molten part of the first sealing portion 21 becoming burrs and adhering to the plate 35 (see FIG. 8).

In a case where the welded layer 30 on the side surface 12A side is not formed, the bipolar electrode 14 where the first sealing portion 21 is previously joined to the electrode plate 15, the negative electrode termination electrode 18 where the first sealing portion 21 is previously joined to the electrode plate 15, the positive electrode termination electrode 19 where the first sealing portion 21 is previously joined to the electrode plate 15, and the termination conductor 20 to which the first sealing portion 21A is previously joined are laminated in the laminating step with reference to the side that corresponds to the side surface 12A side where the welded layer 30 is not formed. If the amount of the burrs on the plate 35 increases in a case where the welded layer 30 is formed on the side surface 12A side, it is necessary to remove the burrs before the second sealing portion forming step. However, by laminating the bipolar electrode 14, the negative electrode termination electrode 18, the positive electrode termination electrode 19, and the termination conductor 20 with reference to the side that corresponds to the side surface 12A side where the welded layer 30 is not formed, it is possible to ensure lamination accuracy on the side surface 12A side serving as an opening wall, and thus there is no need to form the welded layer 30 on the side surface 12A side and there is no need to remove the burrs from the plate 35.

In addition, the formation of the welded layer 30 is not limited to hot plate fusion and the welded layer 30 may be formed by ultrasonic fusion, infrared fusion, and so on. In the case of ultrasonic fusion, an ultrasonic horn is pressed against the outer edge parts of the first sealing portions 21 and 21A adjacent in the lamination direction D and an ultrasonic wave of approximately tens of kHz is applied from the ultrasonic horn to the outer edge parts of the first sealing portions 21 and 21A. The welded layer 30 can be formed by the outer edge parts of the first sealing portions 21 and 21A being melted and solidified by frictional heat as a result of the ultrasonic wave application. As for hot plate fusion, it is necessary to wait until the hot plate and the first sealing portions 21 and 21A are sufficiently cooled after heating is stopped in order to prevent the first sealing portions 21 and 21A from sticking. In contrast, as for ultrasonic fusion, it is possible to perform cooling more quickly than in the case of hot plate fusion by releasing the heat of the first sealing portions 21 and 21A from the ultrasonic horn or the like although natural cooling is performed after the ultrasonic wave application is stopped. Accordingly, the time that is required for the welded layer forming step can be shortened. In addition, it is also possible to reduce the burrs that adhere to the plate 35 as compared with hot plate fusion.

In the case of infrared fusion, the welded layer 30 can be formed on the first sealing portions 21 and 21A by the laminated first sealing portions 21 and 21A being irradiated with infrared rays from an infrared heater disposed apart from the side surface 11*a* of the electrode laminate body 11. By this method, it is possible to selectively heat only the resin of the first sealing portions 21 and 21A by controlling the wavelength of the infrared rays and it is possible to form the welded layer 30 by fusing the first sealing portions 21 to each other and the first sealing portions 21 and 21A to each other with high quality and in a short time.

Figure 12:
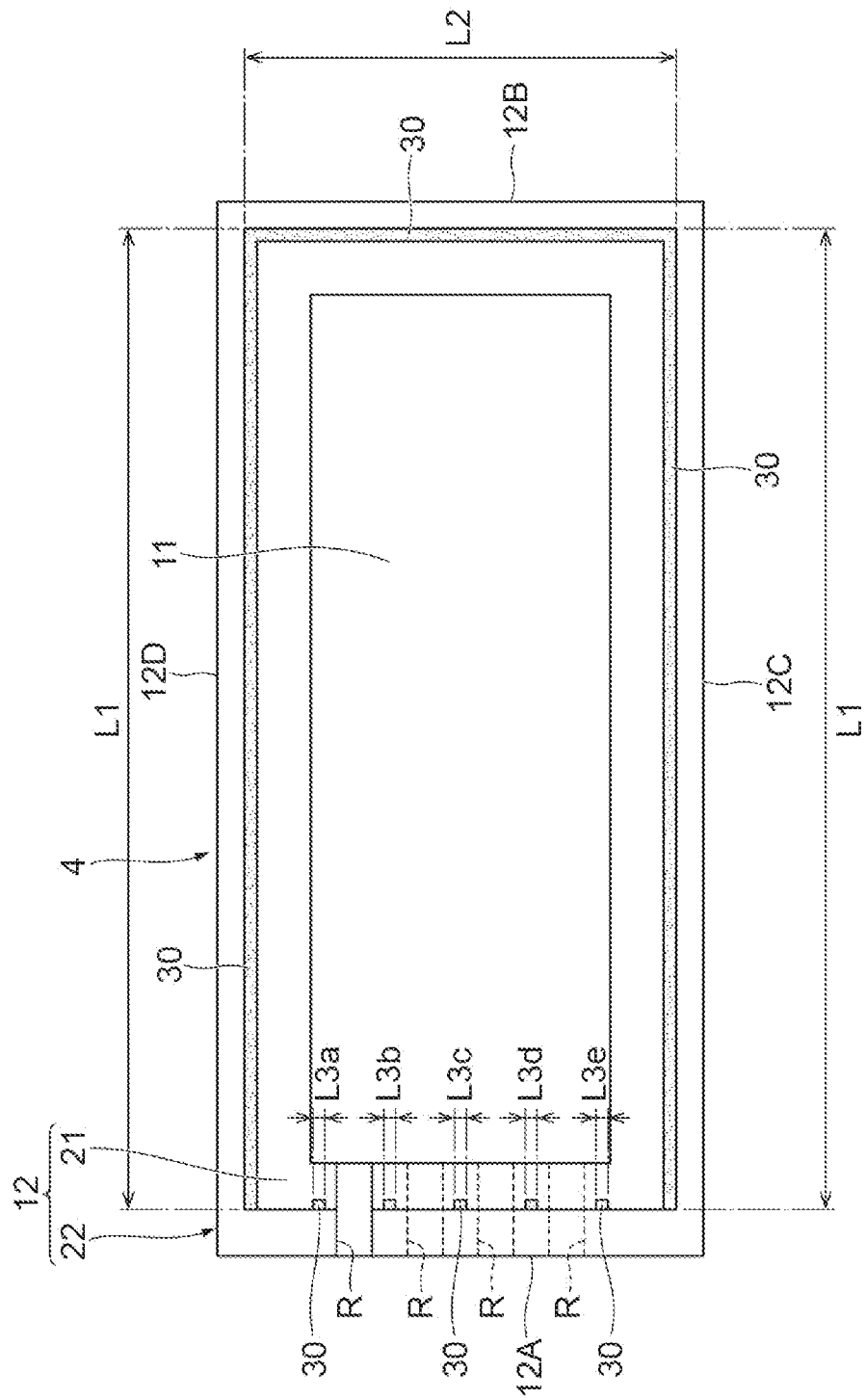
FIG. 12 is a schematic plan view illustrating another modification example of the welded layer.

It should be noted that the in-plane-direction extension width of the welded layer 30 of the side surface 12A to the side surface 12D as viewed from the lamination direction D may be different between the non-opening wall and the opening wall although the thickness of the welded layer 30 in the direction toward the inside (electrode laminate body 11 side) from the outside surface of the sealing body 12 is different between the non-opening wall and the opening wall in the embodiment described above. For example, as illustrated in FIG. 12, the welded layer 30 may be continuously provided along the in-plane direction of the side surface 12B to the side surface 12D on the side surface 12B to 12D side as non-opening walls and the welded layer 30 may be partially provided at regular intervals along the in-plane direction of the side surface 12A on the side surface 12A side as an opening wall. In this case, the width of the welded layer 30 along the in-plane direction of the side surface 12A (total width of L3*a* to L3*e*) is smaller than an in-plane-direction width L1 of the welded layer 30 along the in-plane direction of the side surfaces 12A and 12C and an in-plane-direction width L2 of the welded layer 30 along the in-plane direction of the side surface 12B. Even in such a form, actions and effects similar to those of the embodiment described above are exhibited.

REFERENCE SIGNS LIST

4: power storage module, 11: electrode laminate body, 11*a*: side surface, 12: sealing body, 12A: side surface (opening wall), 12B to 12D: side surface (non-opening wall), 14: bipolar electrode, 15: electrode plate (metal plate), 15*a*: first surface, 15*b*: second surface, 15*c*: edge portion, 21, 21A: first sealing portion, 22: second sealing portion, 30: welded layer, 31: opening region, 32: non-opening region, D: lamination direction (first direction), R: through hole, V: internal space, W (W1 to W3): width of welded layer.

The invention claimed is:

1. A power storage module comprising:
    an electrode laminate body having a plurality of electrodes laminated in a first direction;
    a separator containing an electrolyte and arranged in an internal space formed between the electrodes adjacent to each other in the electrode laminate body; and
    a sealing body provided on an outer peripheral portion of the electrode laminate body and sealing the internal space, wherein
    the plurality of electrodes include a bipolar electrode having a positive electrode active material layer on one surface of a current collector and having a negative electrode active material layer on the other surface of the current collector,
    the sealing body includes first sealing portions and a second sealing portion,
    the first sealing portion is joined to an edge portion of a current collector of each of the plurality of electrodes and has a protruding part protruding outward beyond the edge portion of the current collector,
    the second sealing portion is provided so as to cover an outer periphery of the first sealing portion on a side surface of the electrode laminate body extending in the first direction,
    the sealing body has a welded portion where the protruding parts of the first sealing portions adjacent to each other in the first direction are welded to each other and has an opening wall provided with a communication hole allowing the internal space and an outside of the sealing body to communicate with each other and a non-opening wall lacking the communication hole, and
    a width of the welded portion at the opening wall is smaller than a width of the welded portion at the non-opening wall when viewed from the first direction.

2. The power storage module according to claim 1, wherein
    the opening wall is provided with an opening region where the communication hole is disposed and a non-opening region where the communication hole is not disposed, and
    the width of the welded portion in the non-opening region is larger than the width of the welded portion in the opening region when viewed from the first direction.

3. The power storage module according to claim 1, wherein
    the welded portion is provided at regular intervals at the opening wall when viewed from the first direction, and
    a length of the welded portion at the opening wall along an in-plane direction is smaller than the length of the welded portion at the non-opening wall along the in-plane direction when viewed from the first direction.

* * * * *